Oct. 20, 1959 R. M. KUTS 2,909,081
AUTOMATIC HOLE TREATING MACHINE
Filed June 25, 1958 4 Sheets-Sheet 1
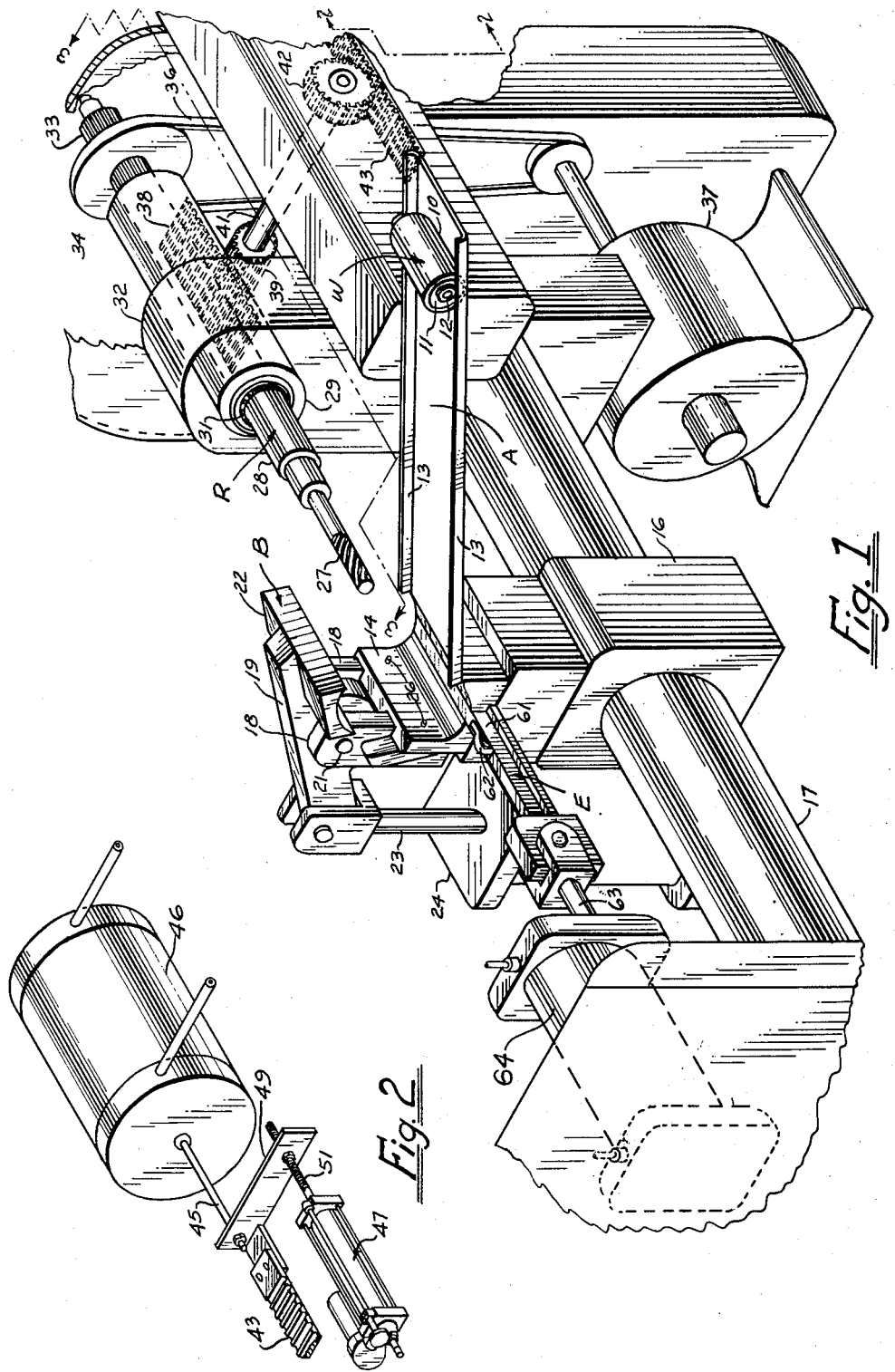

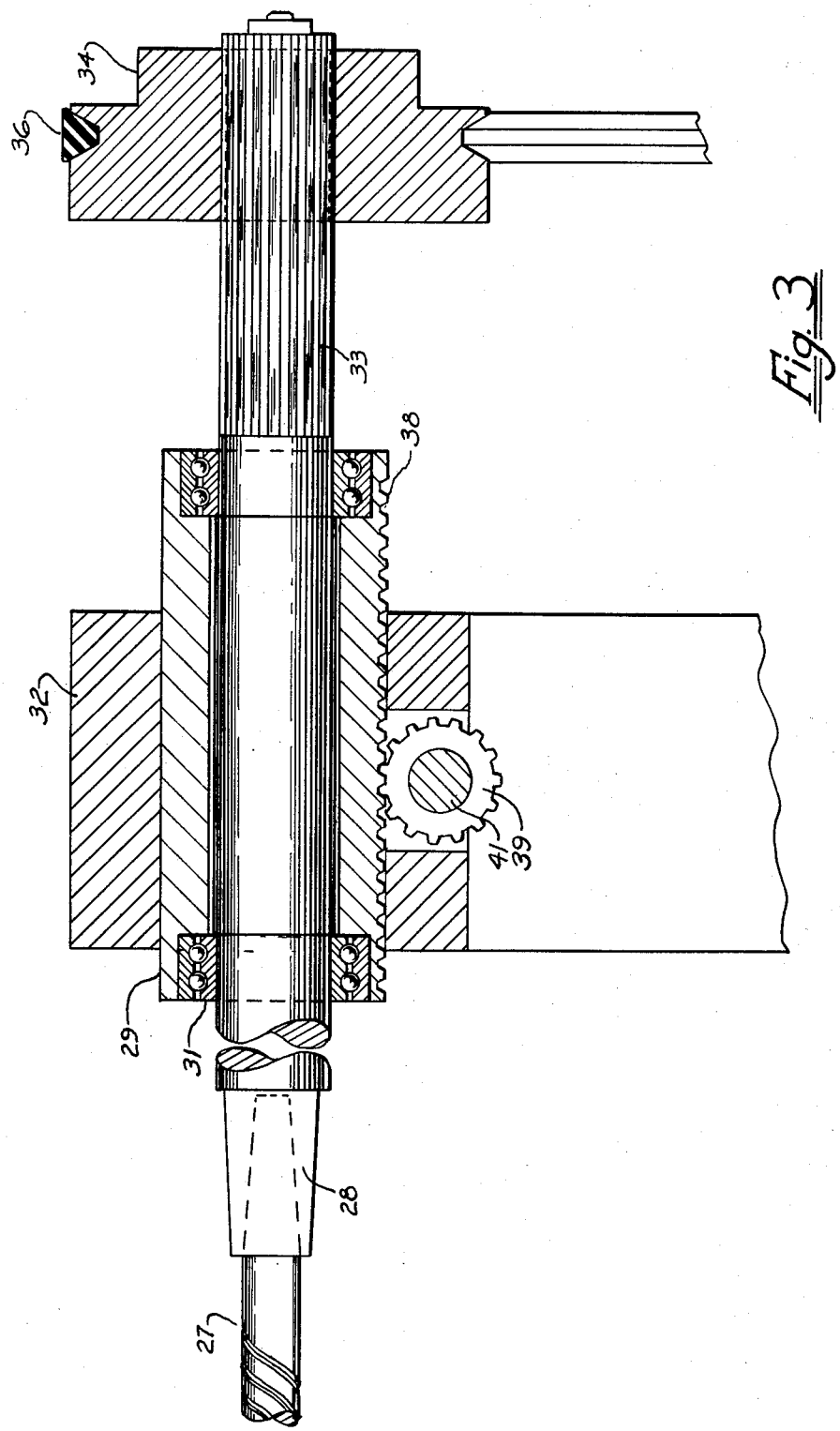

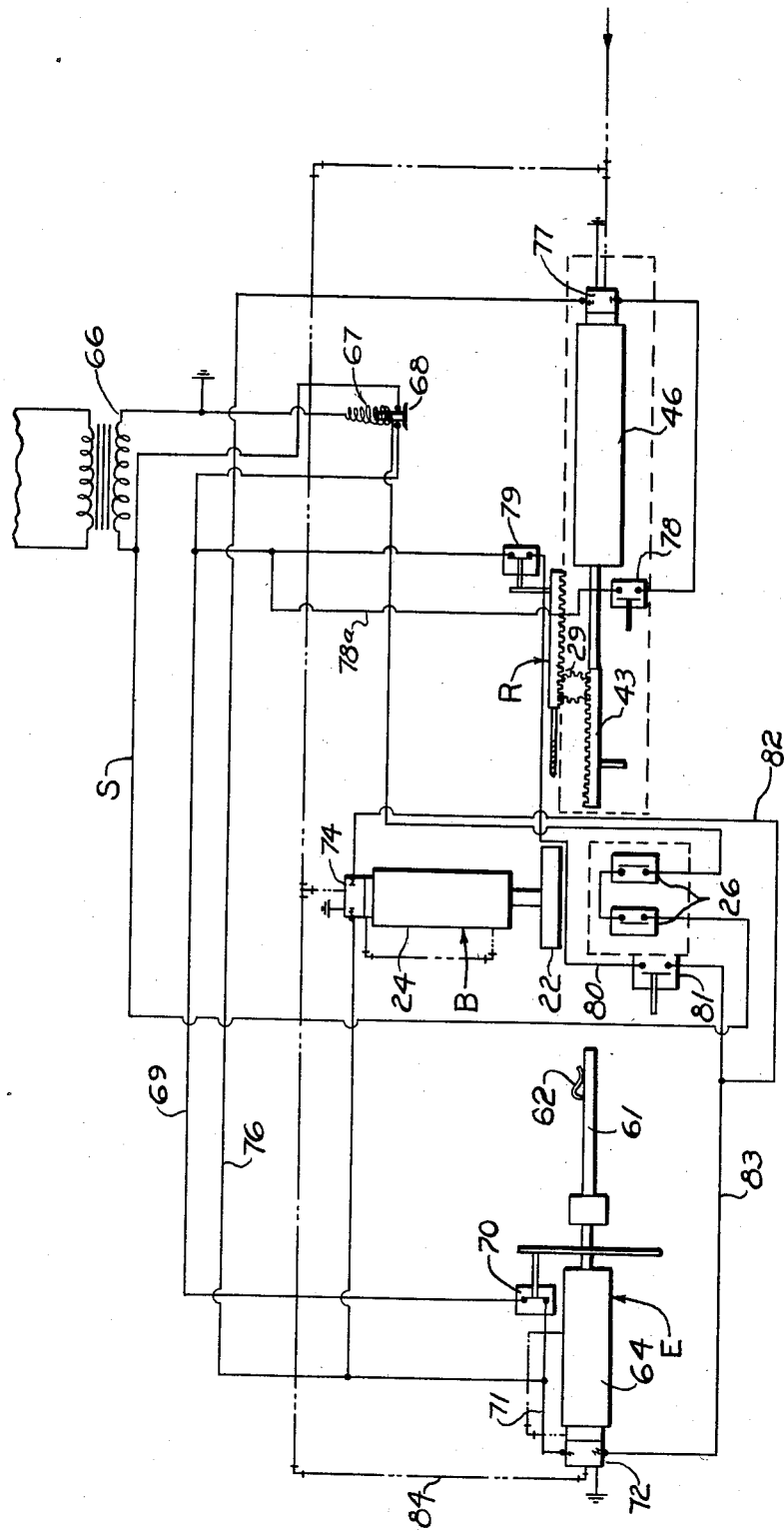

United States Patent Office 2,909,081
Patented Oct. 20, 1959

2,909,081

AUTOMATIC HOLE TREATING MACHINE

Richard Mathew Kuts, Akron, Ohio, assignor to The B. F. Goodrich Company, New York, N.Y., a corporation of New York Application June 25, 1958, Serial No. 744,428

1 Claim. (Cl. 77—3)

Bushings are manufactured by applicant's assignee, The B. F. Goodrich Company, that have rubber and metal parts joined in a mold. After these parts are joined, the central aperture of the assembly has been found to be obstructed by rubber flash. The apparatus of this invention is one that automatically cleans the bore that is so obstructed. In accordance with this invention a chute is provided so that the bushings, which are externally cylindrical, but which may have other shapes, are fed by the force of gravity against a pair of clamp enclosure switches. If both switches are closed by the weight of the bushing this indicates that the bushing is in alignment with the reamer part of the machine. The closure of both switches starts several events. A clamping jaw actuated by a fluid motor at once seizes and holds the properly aligned bushing in preparation for the reaming operation to be performed. A rotary reamer (the exact nature of the reamer's formation is not critical to the invention) advances through the bore in the bushing. A ratchet type extractor is advanced by a fluid motor against the bore of the bushing so that when the reaming operation has been completed and the clamping jaw released, retraction of the extractor at once ejects the bushing from its work position into a tray, thereby permitting the next bushing to roll into place against the pair of switches referred to, thus a new cycle is initiated.

It is a feature of the invention that the sequence of events is adjusted by means of a combination fluid motor and fluid flow restriction device connected by a rack and pinion assembly to drive the spindle of the reamer. Because of the time lag in this arrangement, even though both sensing switches engaged by the bushing are closed, it is certain that the bushing will be clamped before the reamer advances. It is not critical that the extraction device be in its final (advanced) position during the reaming operation but the control of the retraction device is such that it is assured that it will be in its advanced position at least by the time that the reamer itself has retracted from the bushing. By means of this sequence, very little lost time arises in the cycle and the work proceeds without hesitation. The presence of a pair of switches engaged by the work insures that the work must be aligned properly so that it may be precisely clamped to permit the operation involved. Should the work descend from its chute canted or otherwise misaligned it cannot close both switches and the machine stops.

In the drawings:

Fig. 1 is a perspective view of a major portion of the mechanical parts of the apparatus with all unessential design details omitted;

Fig. 2 shows the remainder of the apparatus;

Fig. 3 is a section through the reamer spindle assembly;

Fig. 5 is a schematic diagram.

Figure 4:
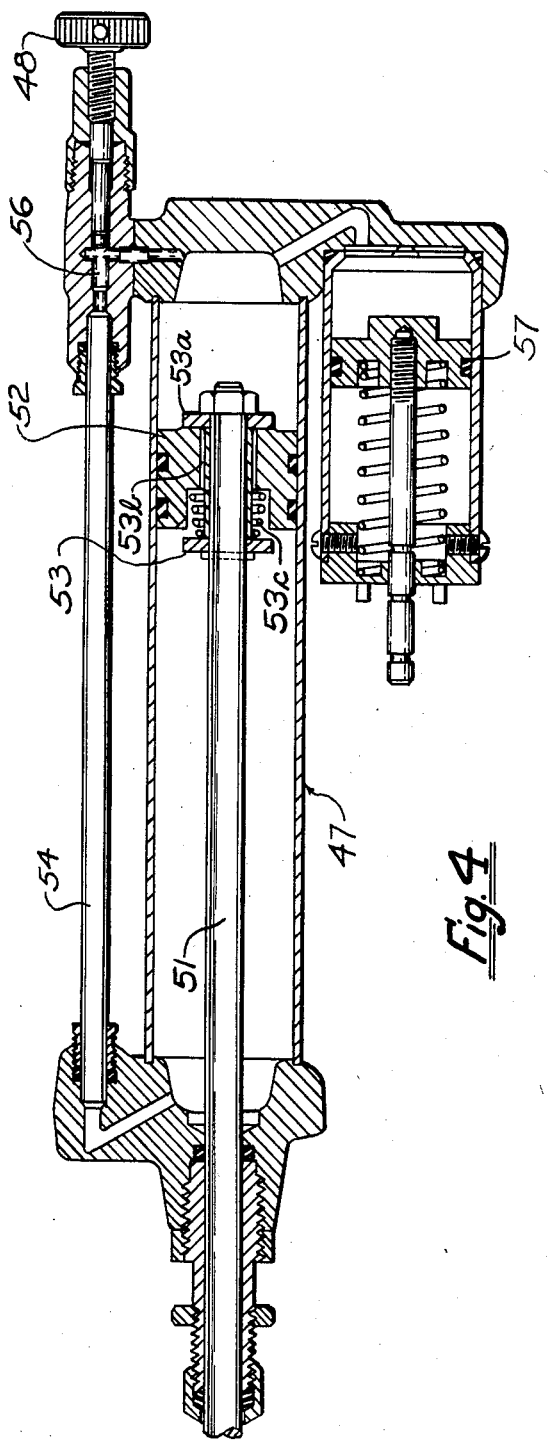
Fig. 4 is a section through the check device.

As seen in Figs. 1 and 2 the apparatus essentially comprises a chute A, clamp B, reamer assembly R and an ejector assembly E.

The work W currently treated by the machine is a metal and rubber member having an outer metal sleeve 10, a rubber body 11 and an inner sleeve 12. During the molding and curing operation, rubber flash flows into the bore of the inner sleeve 12 and must be removed so that the member can be mounted without interference. Members W are loaded by the operator in chute A and the ends of sleeve 12 ride along flanges 13 under gravity as the work rolls into a curved receptacle block 14. Block 14 is supported by a heavy plate 16 mounted on a main frame bar 17.

A clamp is provided that is supported by ears 18, their purpose being to receive clamp arm 19, pivotally mounted by pin 21. The upper clamp jaw 22 grips the work, if it is properly aligned. Clamp arm 21 is connected to a piston rod 23, operated by an air cylinder 24. Axially spaced sensing switches 26 are in the inner clamp block and they are connected so that either switch normally opens a control circuit and a cycle will not be initiated unless both normally open switches are closed thereby indicating that the work is in position and properly aligned, ready for the reamer.

The fluted reaming assembly R includes a fluted reamer 27 although wire bushes or drills could be used, the term "reamer" being used generically. The reamer is mounted in a quill 28 (Fig. 3) which is rotatedly supported in a sleeve 29 by means of bearings 31. The sleeve 29 slides in a housing 32 mounted on the frame tube 17. The quill 28 is splined as at 33 to fit the splined hub of a drive pulley 34 in the manner of a conventional drill press. Drive belt 36 connects to the drive motor 37.

To provide for advance and retraction of the reamer, rack teeth 38 are formed on the under side of the sleeve 29 and are driven by a rack pinion 39 connected to a drive gear 42 that meshes with a drive rack 43. This rack is connected to a piston rod 45 of a power cylinder 46 which is a conventional double-acting hydraulic cylinder. A hydraulic check device 47 (Figs. 2 and 4), has an adjustable needle valve check control 48 and is connected to move with the rack by a plate 49 that mounts the piston rod 51 of the check device.

Referring to Fig. 4 the check device is shown in section. It is a well-known commercial unit and serves to check in one direction only, which in this case is the reamer advance stroke. Piston 52 is slidably mounted on piston rod 51 that has spaced washers 53 and 53a. The piston has bypass ports 53b and is urged toward washer 53a to close ports 53b by spring 53c. When piston rod 51 is moved to the left in Fig. 4, as during the reaming operation, oil in the left-hand chamber presses the piston tight against right-hand washer 53a and closes ports 53b so that all oil must flow through a by-pass line 54 and past a needle valve 56 to the other (right hand) side of the piston. This gives a smooth, controllable checking action. On the other hand, on the return stroke, with the piston rod 51 moving to the right in Fig. 4, oil in the right chamber moves piston 52 to the left and ports 53b are opened so that oil is transferred directly and need not throttle past the needle valve. This provides a smooth controlled feed in the advance direction of the reamer as well as a time delay. The usual spring-loaded make-up cylinder 57 is likewise provided.

The ejector assembly E includes an ejector bar 61 that mounts a leaf-type friction spring 62 and is reciprocated by the piston rod 63 of an air cylinder 64. The spring 62 is arranged so that it flattens into a socket in the bar 61 and permits the bar to advance under the work even though the work is clamped in place. However, when the bar passes far enough under the work to bring the spring 62 on the far side of the work, the shape of the spring is such that when it springs out of its socket retraction of the bar 61 it slides the work from the open clamp and the work falls down into a pan beneath the machine, not shown.

In Fig. 5, a schematic circuit diagram for the apparatus is shown and the operation will be described relative to this diagram. The power is supplied by transformer 66 to a control relay 67 having contacts 68. One of the contacts connects to the undergrounded side of the transformer and the other connects to a line 69 leading to a cycle start switch 70. Also, a line S connects the ungrounded side of the transformer and leads to the coil of relay 67 through the series-connected starting switches 26 previously described. The other side of the relay coil is grounded. When the work is properly positioned to close the starting switches 26 the coil of relay 67 is energized and contacts 68 close. With the ejector in its retracted position the cycle start switch 70 is also closed and a line 71 energizes the ejector control valve 72. This and the other control valves to be described are of the "flip-flop" type and once they are momentarily energized for operation in one direction they remain in the proper position for such operation until they are energized momentarily for operation in the other direction.

At the same time that the control valve 72 for the ejector cylinder is energized for advancing the ejector, a line 73 connected to line 71 energizes a "flip-flop" control valve 74 for the clamping cylinder 24. In addition a line 76 connected to line 71 energizes a control valve 77 for the reamer cylinder 46. Thus all three units are set in operation and the clamp cylinder closes, the ejector starts its motion under the work and the reamer 29 begins to advance. The hydraulic restriction mechanism 47, not shown in this diagram, insures that the work will be clamped before the reamer engages it and thus even though all three units are energized simultaneously, no delay action timer is required.

The reamer feeds smoothly through the bore in sleeve 12 of the work with rack 43 moving to the right in the diagram (the piston rod moves to the left as seen in Fig. 4) until the end of the reamer stroke is reached whereupon a return switch 78 is closed. This connects a hot line 78a energized through relay contacts 68 to the control valve 77 to reverse the valve in order to initiate another feed cycle. However, when switch 79 is closed as the reamer reaches its retracted position, a line 80 leading to switch 81 is energized, and switch 81 closes when the ejector is fully advanced. Line 82 leading to the clamp control valve 74 is now energized to open the clamp. Line 83 leading to the ejector control valve 72 is simultaneously energized to cause retraction of the ejector bar to strip the work from its support. When the work is rejected contacts 26 are open and the coil of the main control relay 67 is deenergized. A new cycle is initiated as soon as the properly positioned piece of work closes contacts 26.

Thus the machine is entirely controlled by the presence or absence of work in the chute and requires no attention other than to supply the chute with work. The machine cannot jam because it will not operate unless the work is properly positioned as sensed by contacts 26. Having completed the detailed description of the preferred embodiment of the invention, I claim:

Apparatus for reaming a bushing comprising a bushing receptacle, a clamp for the bushing, an ejector sliding axially along the receptacle and having ejector finger means for engaging one end of the bushing, an axially movable rotatable reamer opposite said ejector, motor means to rotate said reamer, reversible fluid motor means for operating said clamp, ejector and slidable reamer, check means on said reamer fluid motor means operable to check reamer advance, a control circuit for said fluid motor means, and a pair of axially spaced sensing switches in said receptacle that opens said control circuit unless both switches are closed by a properly positioned bushing.

References Cited in the file of this patent

UNITED STATES PATENTS

| | | |
|---|---|---|
| 1,615,372 | Fiegel | June 25, 1927 |
| 2,042,379 | Barnes | May 26, 1936 |
| 2,271,717 | Schwartz | Feb. 3, 1942 |
| 2,385,521 | Mead | Sept. 25, 1945 |

UNITED STATES PATENT OFFICE

CERTIFICATE OF CORRECTION

Patent No. 2,909,081                                    October 20, 1959

Richard Mathew Kuts

It is hereby certified that error appears in the printed specification of the above numbered patent requiring correction and that the said Letters Patent should read as corrected below.

Column 3, line 5, for "undergrounded" read -- ungrounded --.

Signed and sealed this 26th day of April 1960.

(SEAL)
Attest:

KARL H. AXLINE                                                    ROBERT C. WATSON
Attesting Officer                                             Commissioner of Patents